US008698032B2

(12) United States Patent
Takahashi

(10) Patent No.: US 8,698,032 B2
(45) Date of Patent: Apr. 15, 2014

(54) MAIL SORTING SYSTEM AND METHOD OF SORTING MAILS

(75) Inventor: Naoyuki Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1434 days.

(21) Appl. No.: 11/938,372

(22) Filed: Nov. 12, 2007

(65) Prior Publication Data

US 2008/0110808 A1 May 15, 2008

(30) Foreign Application Priority Data

Nov. 10, 2006 (JP) ................................ 2006-305069

(51) Int. Cl.
*G06K 9/00* (2006.01)

(52) U.S. Cl.
USPC ............................ 209/584; 209/900; 700/224

(58) Field of Classification Search
USPC .................................. 209/584, 900; 700/224
See application file for complete search history.

(56) References Cited

U.S. PATENT DOCUMENTS

| | | | | |
|---|---|---|---|---|
| 6,421,451 | B1 * | 7/2002 | Shiratsuchi et al. .......... | 382/101 |
| 7,415,130 | B1 * | 8/2008 | Rundle et al. ................. | 382/101 |
| 2009/0159508 | A1 * | 6/2009 | Kostyniuk et al. ............ | 209/584 |
| 2011/0192770 | A1 | 8/2011 | Goertz et al. | |

FOREIGN PATENT DOCUMENTS

| | | | |
|---|---|---|---|
| CA | 2 574 809 | A1 | 1/2006 |
| CA | 002574809 | a1 * | 1/2007 |
| DE | 102004035365 | A1 | 2/2006 |
| JP | S49-38896 | A | 4/1974 |
| JP | 4-199482 | A | 7/1992 |
| JP | 2002-355613 | A | 12/2002 |
| JP | 2005-157919 | A | 6/2005 |
| JP | 2005-177660 | A | 7/2005 |
| JP | 2005-254170 | A | 9/2005 |
| JP | 2006-272057 | A | 10/2006 |

OTHER PUBLICATIONS

European Search Report for EP Application No. 07021741.9, dated Feb. 8, 2008.
Japanese Office Action for JP Application No. 2006-305069 mailed on Jan. 31, 2012 with English Translation.

* cited by examiner

*Primary Examiner* — Stefanos Karmis
*Assistant Examiner* — Michael E Butler
(74) *Attorney, Agent, or Firm* — Sughrue Mion, PLLC

(57) ABSTRACT

An ID barcode printing section 13 prints IDs for identifying arrived mails. An address recognition section 21 recognizes address information for the primary sorting and the secondary sorting from the address images photographed by an image input section 14 for saving in an ID database 25. Based on the recognized primary sorting address information, the sorting control section 15 sorts the mails in a sorting box 16, 17 that corresponds to a secondary sorting post office 30. Upon filling up the sorting boxes 16, 17, the mails therein are transferred to a transportation medium. An ID writing section 18 writes secondary sorting address information of the mails in the transportation medium that is read from an ID database 25 for recording on the transportation medium. Upon reading the address information that is recorded on the transportation medium by an ID information read-out section 37, a sorting control section 34 in the secondary sorting post office 30 acquires the address information on each mail in the transportation medium for sorting each mail in sorting boxes 35, 36 for delivery address.

7 Claims, 6 Drawing Sheets

MAIL SORTING SYSTEM AND METHOD OF SORTING MAILS

INCORPORATION BY REFERENCE

This application is based upon and claims the benefit of a priority from Japanese patent application no. 2006-305069, the disclosure of which is incorporated herein in its entirely by reference.

TECHNICAL FIELD

This invention relates to a mail sorting system and a method of sorting mails.

BACKGROUND ART

In order to efficiently performing a secondary sorting (or secondary classification that is a sorting processing for delivery) of mails at a post office, it was conventional to adopt either one of the following two methods that are disclosed in Patent Document 1 (Japanese patent publication no. 2002-355613 entitled "Delivery Processing Method and System Therefor"). One is "a method of printing address barcode on mails" and the other is "a database management method of mail IDs and address information".

The former method is to determine address information of collected mails by an address recognition section that identifies the addresses of each mail and the determined address information is printed on the surface of each mail as an address barcode. In the secondary sorting stage, mails are sorted by reading out the address barcodes printed on the mails. On the other hand, the latter method is to print mail IDs on mails for identifying each collected mail and determine the address information from the address recognition section for identifying the address of each mail. The mail IDs and the determined address information are managed as an ID database for performing the secondary sorting with reference to the ID database in the secondary sorting stage.

Firstly, the former method will be briefly described as a first prior art with reference to FIGS. 3 and 4. FIG. 3 is a block diagram to show a system configuration comprising a primary sorting post office and a secondary sorting post office that constitute a mail sorting system according to the first prior art. FIG. 4 is a flowchart for describing the operation of the conventional mail sorting system in FIG. 3.

(Construction of First Prior Art)

The first prior art or a mail sorting system 100A as shown in FIG. 3 comprises a primary sorting post office 10A that engages with a primary sorting works (processing for arrived mails) for performing a primary stage sorting works of the arrived mails and a secondary sorting post office 30A that engages with a secondary sorting works (processing for delivery mails) for performing a second stage sorting works of the primarily sorted mails.

The primary sorting post office 10A comprises a sorter main body 11A for performing the primary sorting works and an address recognition unit 21 for performing an address recognition processing that is necessary in both of the primary sorting works and the secondary sorting works. The secondary sorting post office 30A comprises a sorter main body 31A that engages with the secondary sorting works.

Moreover, the sorter main body 11A that engages with the primary sorting works includes a feeding section 12, an ID barcode printing section 13, an image input section 14, a sorting control section 15A, sorting boxes 16, 17 and an address barcode printing section 19. The address recognition unit 21 includes an address recognition control section 22, an OCR (Optical Character Reader) 23, VCS (Video Coding System) 24 and an ID database 25.

It is to be noted in the sorter main body 11A that the feeding section 12 feeds mails to the sorter main body 11A as primary feeding materials. The ID barcode printing section 13 is a printer for printing an ID barcode on the surface of each mail for identifying such mail. The image input section 14 is a scanner for photographing the addresses and the barcodes, wherein the images are inputted to the address recognition unit 21 for extracting addresses and ID characters printed on or attached to the mails.

The sorting control section 15A controls the overall operation of the sorter main body 11A and performs mail sorting (primary sorting) in accordance with the address information. The sorting boxes 16, 17 are used for receiving the primarily sorted mails and plural boxes equal to the number of classifications in the primary sorting are provided. It is to be noted that the number of sorting boxes 16, 17 is sufficient if it is the level necessary to determine the secondary sorting post office 30A.

The address barcode printing section 19 is a printer for printing on the surface of mails the final address information that is recognized by the address recognition unit 21 and necessary for the secondary sorting that is performed by the secondary sorting post office 30A.

The address recognition control section 22 in the address recognition unit 21 is designed to control the OCR 23 and the VCS 24 and also manage the ID database 25. The ID database 25 is a database (DB) for storing the ID for identifying each mail in association with the address information.

It is to be noted that the OCR 23 identifies the ID of each mail based on the address image or the barcode image from the image input section 14 and reads character information including from the ZIP code (postcode) to the town name on such mail. On the other hand, the VCS 24 recognizes, based on the address image and the barcode image, all characters of the address including the address number and the condominium room number to the final level that is necessary for the secondary sorting. That is, the address recognition unit 21 performs not only the address identification processing necessary for the primary sorting but also the final address information identification processing necessary for the secondary sorting that is performed in the secondary sorting post office 30A. The results of processing are recorded on the ID database 25 and printed on the surface of the respective mails by the address barcode printing section 19.

On the other hand, the sorter main body 31A that engages with the secondary sorting comprises a feeding section 32, an address barcode read-out section 38, a sorting control section 34A and sorting boxes 35, 36.

The feeding section 32 in the sorter main body 31A feeds the mails that are primary sorted by the sorter main body 11A to the sorter main body 31A as secondary sorted materials. The address barcode read-out section 38 is a barcode reader for reading out the particular address barcode printed on the surface of the mail by the address barcode read-out section 19 for identifying each mail. The sorting control section 34A is designed to control the overall operation of the sorter main body 31A and sorts the mails in accordance with the address information. The sorting boxes 35, 36 receive the secondarily sorted mails and plural boxes are prepared in accordance with the secondary classifications. It is to be noted that the secondary sorting is designed to perform the final sorting for delivery.

(Operation of the First Prior Art)

Now, the operation of the mail sorting system 100A in FIG. 3 as the first prior art will be described with reference to the flowchart in FIG. 4. In FIG. 4, steps S41 through S58 are operations (processing for arrived mails) in the primary sorting post office 10A, while steps S61 through S68 are operations (processing for delivery mails) in the secondary sorting post office 30A.

In the flowchart in FIG. 4, a first operation is to place mails collected from mailboxes or the like in front of the sorter main body 11A in the primary sorting post office 10A (step S41). The collected mails are, then, fed to the feeding section 12 in the sorter main body 11A for performing the primary sorting (processing for arrived mails) (step S42). The mails to be fed to the feeding section 12 undergo address image reading-of the mails by using an optical scanner or the like in the image input section 14 and the address images are sent to the address recognition section 21 (section S43).

In the address recognition section 21, addresses in the address images are sequentially recognized by the OCR 23 and the VCS 24 in order to determine as the updated address information. The determined address information is sequentially stored in the ID database 25. That is, as the identification processing by the OCR 23 and the VCS 24 proceeds as the address information, they are sequentially stored in the ID database 25 as the updated address information. Moreover, the determined address information is sent to the sorting control section 15A in response to the inquiry from the sorting control section 15A.

In the sorting control section 15A, upon receiving the address information as identified by the address recognition section 21, it is judged if the identification is made to the final level as the address information necessary for performing the secondary sorting in the secondary sorting post office 30A (step S44). If the identification is made to the final level necessary for the secondary sorting (YES in step S44), the address barcode is printed on the surface of the respective mail in the address barcode printing section 19 (step S45) and then the mail is classified and placed in one of the sorting boxes 16, 17 corresponding to the secondary sorting post office 30A (step S46).

On the other hand, if it failed to identify to the final level necessary for the secondary sorting (NO in step S44), the ID barcode printing section 13 prints on the surface of each mail the ID as the ID barcode for identifying each mail and the ID barcode is recorded in the ID database 25 in association with the address information that is insufficient to identify (step S47). Since it is unable to identify the address to the final level of the mail, it is classified in the sorting box for feeding again or second feeding (step S48).

Subsequently, it is placed in front of the sorter main body 11A for retrying the feeding processing of the mail (step S49) and the mail is sent again to the feeding section 12 in the sorter main body 11A (step S50).

Then, the ID barcode printed on the surface of the mail that is fed again to the feeding section 12 is read out by a scanner (the ID barcode read-out section) that is not shown in FIG. 3 (step S51). The sorting control section 15A refers to the ID database 25 in the address recognition unit 21 about the updated address information corresponding to the read-out ID (step S52). The ID database 25 reads out the updated address information corresponding to the particular ID and returns it to the sorting control section 15A.

The sorting control section 15A that received the address information from the ID database 25 judges if the received updated address information identifies the mail to the final level necessary for the secondary sorting (step S53).

If the mail that is fed again is determined to have been identified to the final level necessary for the secondary sorting (YES in step S53), the sorting control section 15A controls the address barcode printing section 19 to print the address barcode on the surface of the mail as is the case in steps S45 and S46 (step S54). The mail is, then, classified and placed in the sorting box corresponding to the address (step S55).

On the other hand, if the mail that is fed again is not identified to the final level necessary for the secondary sorting (NO in step S53), the mail is unable to identify to the final level necessary for the secondary sorting by the machine processing and is sorted in a rejection box for manual processing (step S56). Subsequently, the mail is sorted manually to the final level and placed in the corresponding one of the sorting boxes 16, 17 (step S57).

Now, description will be made on the operation of the secondary sorting post office 30A that engages with the secondary sorting (processing for delivery) of the mails that passed through the primary sorting. Firstly, the mails that passed through the primary sorting are brought in front of the sorter main body 31A in the secondary sorting post office (step S61). In order to perform the secondary sorting (processing for delivery), the mails are fed to the feeding section 32 in the sorter main body 31A (step S62). The address barcodes on the mails are read out by an optical scanner or the like in the address barcode read-out section 38 before being sent to the sorting control section 34A (step S63).

Thereafter, in the sorting control section 34A, a judgment is made if the read-out address barcodes include the final level information that is sufficient as the address information corresponding to the address ID barcode from the address barcode read-out section 38 (step S64). If it is determined that the final level information sufficient for the secondary sorting have been acquired (YES in step S64), the mails are placed in the sorting boxes 35, 36 for the address corresponding to the acquired address information (step S65).

On the other hand, if it is determined that the acquired information is insufficient for the final level for the secondary sorting (NO in step S64), the address information of the particular mail is determined to be impossible by the machine processing for the secondary sorting and the particular mail is placed in a rejection box for a manual sorting (step S66). Then, the mail undergoes a manual sorting and is placed in the corresponding sorting box, i.e., either one of the sorting boxes 35, 36 (step S67).

Upon completing the secondary sorting in the secondary sorting post office 30A in the above manner, the mails in each sorting box 35, 36 are taken out for delivery processing to each address (step S68).

Now, a second prior art of "a method of managing mail IDs and address information in a database" will be briefly described with reference to FIG. 5 and FIG. 6. FIG. 5 is a system configuration of a primary sorting post office and a secondary sorting post office that constitute the second prior art mail sorting system. FIG. 6 is a flowchart for describing the operation of the prior art mail sorting system as shown in FIG. 5.

(Construction of the Second Prior Art)

Similar to the first prior art, the second prior art also comprises, as shown in FIG. 5, a primary sorting post office 10B that engages with a primary sorting (processing for arrived mails) corresponding to a first stage sorting of arrived mails and a secondary sorting post office 30B that engages with a secondary sorting corresponding to a second stage sorting of the mails that passed through the primary sorting.

The primary sorting post office 10B comprises a sorter main body 11B that engages with the primary sorting and an address recognition unit 21 that engages with an address recognition processing necessary for primary sorting works and secondary sorting works. The secondary sorting post office 30B comprises a sorter main body 31B that engages with the secondary sorting works and an address recognition unit 21B that engages with an address recognition processing necessary for the secondary sorting. It is to be noted that the address recognition unit 21B in the secondary sorting post office 30B is constructed to transfer the information of the address recognition section 21 in the primary sorting post office 10B by way of a communication infrastructure.

Moreover, the sorter main body 11B that engages with the primary sorting works comprises a feeding section 12, an ID barcode printing section 13, an image input section 14, a sorting control section 15B, sorting boxes 16, 17 and an address barcode printing section 19. The address recognition unit 21 comprises an address recognition control section 22, an OCR (Optical Character reader) 23, a VCS (Video Coding System) 24 and an ID database 25. This means that the sorter main body 11B is completely identical to the sorter main body 11A in FIG. 3 except that the address barcode printing section 19 in the sorter main body 11A in FIG. 3 is deleted and the sorting control section 15A is replaced by the sorting control section 15B. It is to be noted here that the sorting control section 15*b* or the address recognition control section 22 are provided with a function for transporting contents stored in the ID database 25 in the address recognition unit 21 to the ID database 25B in the address recognition unit 21B in the secondary sorting post office 30B by way of a communication infrastructure.

This means that in the primary sorting post office 10B in FIG. 5 the address information necessary for the secondary sorting is not printed on each mail, instead the address information that are stored in the ID database 25 after identification processing in the address recognition unit 21 to the level necessary for secondary sorting are transferred to the ID database 25B in the address recognition unit 21B in the secondary sorting post office 30B. And all other operations are identical to those in the primary sorting post office 10A in FIG. 3.

On the other hand, the sorter main body 31B that engages with the secondary sorting works comprises a feeding section 32, an address barcode read-out section 38, a sorting control section 34B and sorting boxes 35, 36. The address recognition unit 21B comprises an address recognition control section 22B, an OCR (Optical Character Reader) 23B, a VCS (Video Coding System) 24B and an ID database 25B. This means that the sorter main body 31B is completely identical to the sorter main body 31A in FIG. 3 except that the address barcode read-out section 38 and the sorting control section 34A in the sorter main body 31A in FIG. 3 are replaced by the ID barcode read-out section 33 and the sorting control section 34B, respectively. It is to be noted that in the second prior art as described hereinabove, the address recognition unit 213 that has the same construction as the address recognition unit 21 in the primary sorting post office 10A in FIG. 3 is also provided in the secondary sorting post office 30B so that information from the address recognition unit 21 in the primary sorting post office 10B is transferred.

The feeding section 32 and the sorting boxes 35, 36 in the sorter main body 31B are completely identical to those in the sorter main body 31A in FIG. 3. The feeding section 32 feeds to the sorter main body 31B mails that are primarily sorted by the sorter main body 11B as the secondary feeding materials. The sorting boxes 35, 36 are designed to place secondarily sorted mails. The ID barcode read-out section 33 is a reader to reads out the ID barcodes that are printed on the surface of mails by the ID barcode printing section 13 for identifying each mail. The sorting control section 34B controls the overall operation of the sorter main body 31B and places the secondary sorted mails in the sorting boxes 35, 36.

It is to be noted that as described hereinabove the address recognition unit 21B in the secondary sorting post office 30B is designed to transfer information from the address recognition unit 21 in the primary sorting post office 10B by way of a communication infrastructure. The same IDs and the updated address information as those stored in the ID database 25 in the primary sorting post office 10B are recorded in the ID database 25B in the secondary sorting post office 30B.

(Operation of the Second Prior Art)

Now, the operation of the mail sorting system 100B of the second prior art as shown in FIG. 5 will be described with reference to the flowchart in FIG. 6. In FIG. 6, steps S71-S86 are directed to operations (processing for arrived mails) in the primary sorting post office 10B, while steps S91-S99 are directed to operations (processing for delivery mails) in the secondary sorting post office 30B.

In the flowchart in FIG. 6, mails that are collected from mail boxes or the like are first brought in front of the sorter main body 11B in the primary sorting post office 10B (step S71). Subsequently, the collected mails are fed to the feeding section 12 in the sorter main body 11B for performing the primary sorting (processing for arrived mails) (step S72). The mails brought to the feeding section 12 are fed to the ID barcode printing section 13 for printing ID as an ID barcode for identifying each mail on the surface thereof (step S73). Images of the addresses and the ID barcodes on the mails are read out by an optical scanner or the like in the image input section 14 and the images are sent to the address recognition unit 21 (step S74).

In the address recognition unit 21, addresses and IDs are sequentially recognized by the OCR 23 and the VCS 24 in order to determine the updated address information corresponding to each ID. The determined IDs and address information are sequentially stored in the ID database 25 and simultaneously transferred to the ID database 25B in the secondary sorting post office 30B by way of a communication infrastructure before being stored therein. That is, as the recognition processing proceeds by the OCR 23 and the VCS 24 as the address information, they are sequentially stored in the ID database 25 as the updated address information and simultaneously transferred to the ID database 25B in the secondary sorting post office 30B for storage by way of a communication infrastructure. Moreover, the determined IDs and the address information are sent to the sorting control section 15B in response to an inquiry from the sorting control section 15B.

In the sorting control section 15B, upon receiving the recognized IDs and the address information, a judgment is made if each mail is recognized to the final level as the address information necessary for performing the secondary sorting by the secondary sorting post office 30B (step S75). If recognized to the final level for performing the secondary sorting (YES in step S75), the mails are placed in the sorting boxes 16, 17 corresponding to the respective address for the secondary sorting post office 30B (step S76).

On the other hand, if not recognized to the final level necessary for performing the secondary sorting (NO in step S75), it failed to recognize the addresses to the final level and thus such mails are placed in a sorting box for feeding again (step S77).

Subsequent processing steps S78-S85 are identical to the steps S49-S57 in the first prior art as shown in FIG. 4 except the printing operation of the address information in step S54. Accordingly, detailed descriptions on these steps will be abbreviated herein.

Then, the operation of the secondary sorting post office 30B that engages with the secondary sorting (processing for delivery) of the mails that passed through the primary sorting will be described. Firstly, the mails that completed the primary sorting are brought in front of the sorter main body 31B in the secondary sorting post office 30B (step S91) and fed to the feeding section 32 in the sorter main body 31B for performing the secondary sorting (processing for delivery) (step 92). The ID barcode printed on each mail is read out by an optical scanner or the like in the ID barcode read-out section 33 before being sent to the sorting control section 34B (step S93).

Thereafter, in the sorting control section 34B, an inquiry is made to the address recognition unit 21B about the address information corresponding to the ID barcode from the ID barcode read-out section 33 (step S94). The address recognition unit 21B reads out the address information that is transferred from the primary sorting post office 10B and stored in the ID database 25B and returns the address information to the sorting control section 34B. The sorting control section 34B checks if the address information read out from the ID database 25B is the final level sufficient for the secondary sorting (step S95). If the final level information necessary for the secondary sorting is recognized (YES in step S95), the mail is placed in the corresponding one of the sorting boxes 35, 36 (step S96).

On the other hand, if the acquired information is not the final level sufficient for the secondary sorting (NO in step S95), the particular mail is determined to have the address information unable to be machine processed for secondary sorting that sorts mails in accordance with their addresses and thus put in a rejection box requiring a manual sorting (step S97). Consequently, a manual sorting is carried out on the mails in the rejection box and the mails are placed in the corresponding one of the sorting boxes 35, 36 (step S98).

Upon completing the secondary sorting in the secondary sorting post office 30B as described hereinabove, the mails in each sorting box 35, 36 are taken out for processing for delivery to each address (step S99).

However, conventional mail sorting systems such as those described hereinabove have the following problems:

In case of the "method of printing address barcode on the mail surface" such as the first prior art as shown in FIG. 3 and FIG. 4, it is necessary for the address recognition unit 21 to determine the address to the level necessary for the secondary sorting and print it on each mail by the address barcode printing section 19. However, since the level of address necessary for secondary sorting normally includes not only the town name but also the address number, it is most likely that possibility of recognizing such level of address by using only the OCR 23 is not high. The addresses of the mails that failed to recognize by the OCR 23 are generally determined by the VCS 24, which requires relatively long processing time. Accordingly, they are determined that the address information is not recognized to the final level in step S44 in the flowchart in FIG. 4 (i.e., NO in step S44), there are very high possibilities to go to the retrial route in steps S47 and thereafter.

The retrial route in steps S47 and thereafter requires that the mails are fed again subsequent to the address recognition by an offline processing of the VCS 24, i.e., the address recognition by the offline video coding or the like and requires wasteful works of processing the mails through the sorter main body twice. On the other hand, in order to reduce the wasteful works, it is required to recognize more mail addresses to the final level necessary for secondary sorting in judgment processing starting from step S44. As a result, there is no way other than securing time for processing the online video coding for the VCS 24.

In other words, generally, employed is a method of realizing a long processing time for the VCS 24 by providing a long delay route between step S43 and step S44. As a result, there are problems of causing a significant delay in the overall sorting processing and increasing in facility size of the sorter main body 11A.

On the other hand, in case of the "database management method of mail IDs and address information" of the second prior art as shown in FIG. 5 and FIG. 6, it is necessary to transfer the address information that is recorded in association with an ID for specifying each mail from the ID database 25 in the primary sorting post office 10B to the ID database 25B in the secondary sorting post office 30B using a communication infrastructure, thereby requiring to build a large scale communication infrastructure between the post offices. It is impossible for some enterprises that handle postal business to build such communication infrastructure or it is sometimes difficult to recover the investment to such communication infrastructure.

Additionally, it is a problem in these schemes to unitarily control all data on address information in the ID database 25, 25B. For example, in an event that the contents recorded in the ID database 25B are damaged in the secondary sorting step, it is required to start again from the primary sorting or alternatively to add a step of resending all of the recorded contents from the ID database 25 in the primary sorting post office 10B to the ID database 25B in the secondary sorting post office 30B.

Since most of the secondary sorting is normally performed in the midnight or early in the morning, it is really difficult at such time frame to suddenly have a staff or staffs for performing video coding of mails even if a decision is made to start again from the primary sorting, thereby limiting the secondary sorting with the recognition results of the OCR 23. However, as described hereinabove, chance of success in sorting mails only by the OCR 23 is low and there causes a significant amount of manual sorting.

On the other hand, even if an attempt is made to resend all of the data from the ID database 25 in the primary sorting post office 10B to the ID database 25B in a particular secondary sorting post office 30B, this is an irregular processing different from the normal processing, thereby making it very difficult to suddenly have an experienced worker in the resending processing.

Similarly, in case of any trouble in the communication infrastructure to transfer data from the ID database 25 to the ID database 25B in this scheme, it may trigger large scale consequential troubles that disable the secondary sorting of all mails in the secondary sorting post office 30B.

SUMMARY

In light of the foregoing troubles in prior art, it is an exemplary object of the present invention to provide a mail sorting system and a mail sorting method in which IDs and address information for specifying mails are recorded on a transportation/storage medium such as trays, mail sacks or the like for transporting or storing mails to a secondary sorting post office where the IDs and address information recorded on the transportation or storing media such as the trays, mail sacks or the like are read out.

According to an aspect of the present invention, there is provide (1) a mail sorting system comprising a primary sorting post office for performing primary sorting of mails as arrived mail processing and a secondary sorting post office for performing a secondary sorting of the primary sorted mails, wherein: the primary sorting post office comprises at least ID printing means for printing an ID on each arrived mail, address recognition means for sequentially recognizing address information necessary for primary sorting and secondary sorting from an address image of each mail and for saving the address information in association with the IDs in a database, sorting control means for sorting the mails in sorting boxes corresponding to the secondary sorting post office based on the address information necessary for primary sorting recognized by the address recognition means and for transferring mails in any of the sorting boxes into a transportation/storage medium at the time of filling the sorting box, and information writing means for acquiring from the database the address information necessary for secondary sorting of the mails that are transferred into the transportation/storage medium and for writing the address information in association with the IDs in a recording mechanism provided with the transportation/storage medium in such manner to record and read information; and the secondary sorting post office comprises at least information read-out means for reading out the address information for each ID recorded in the recording mechanism on the transportation/storage medium from the primary sorting post office, and delivery sorting control means for reading out the ID printed on each mail contained in the transportation/storage medium, acquiring the address information for the mail by the address information for each ID that is read out by the information read-out means, and sorting the mails in sorting boxes for delivering the mails based on the acquired address information.

Other exemplary embodiments of the present invention are expressed as follows:

(2) A mail sorting system comprising a primary sorting post office for primary sorting mails as a processing for arrived mails and a secondary sorting post office for secondary sorting the primary sorted mails as a processing for delivery mails, wherein: the primary sorting post office comprises at least feature extraction means for extracting features of each arrived mail in order to provide a feature code for identifying the mail, address recognition means for sequentially recognizing from address images of the mails address information thereof that are necessary for the primary sorting and the secondary sorting and for saving the address information in a database in association with the feature codes, sorting control means for sorting the mails in sorting boxes corresponding to the secondary sorting post office based on the address information necessary for the primary sorting that is recognized by the address recognition means and for transferring the mails in each of the sorting boxes into a transportation/storage medium for transporting/storing the mails when each of the sorting boxes is filled, and information writing means for acquiring address information necessary for secondary sorting of the mails from the database and for writing the acquired address information in association with the feature codes on a recording mechanism that is provide with the transportation/storage medium in a manner to write and read information, and the secondary sorting post office comprises at least information read-out means for reading out the address information for each feature code that is recorded on the transportation/storage means from the primary sorting post office, and delivery sorting control means for grasping the feature codes for identifying the mails by extracting features of mails in the transportation/storage medium, acquiring the address information on the mails from the address information for each feature code that is read out by the information read-out means and for sorting the mails into sorting boxes for delivery of the mails based on the acquired address information.

(3) A mail sorting system of claim 2, wherein the feature of each mail that the feature extraction means extracts uses at least shape and/or color information of the mail.

(4) A mail sorting system of claim 1, wherein the time when the information writing means records the address information on the transportation/storage medium in association with the feature code is the time when the sorting control means detects the full-up of the sorting box corresponding to the secondary sorting post office and transfers the mails in the sorting box into the transportation/storage medium.

(5) A mail sorting system of claim 1, wherein the time when the information read-out means reads out the address information for each feature code that is recorded on the transportation/storage medium from the primary sorting post office by the recording mechanism is on or before the time when the transportation/storage medium reaches the counter for performing the machine processing for the secondary sorting.

(6) A mail sorting system of claim 1, wherein the recording mechanism on the transportation/storage medium comprises means for mounting a non-contact IC chip that can record at least address information for secondary sorting in association with the ID or the feature code, or means for affixing a two dimensional barcode that can record at least the address information for secondary sorting in association with the ID or the feature code.

(7) A mail sorting system of claim 1, wherein the recording mechanism on the transportation/storage medium additionally records information including at least shape and/or color of the mail and/or the sender of the mails.

(8) A mail sorting method in a mail sorting system comprising a primary sorting post office for primary sorting mails as a processing of arrived mails and a secondary sorting post office for secondary sorting the primary sorted mails as a processing of delivery mails, comprising in the primary sorting post office at least: an ID printing step for printing on each mail an ID for identifying each arrived mail; an address recognition step for sequentially recognizing from an address image of each mail address information that is necessary for the primary sorting and the secondary sorting; a sorting control means for sorting the mails in sorting boxes corresponding to the secondary sorting post office based on the address information that is necessary for the recognized primary sorting and upon filling up either one of the sorting box for transferring the mails sorted in the sorting box to a transportation/storage medium for transporting/storing the mails sorted in the sorting box; and an information recording step for recording on a recording mechanism that is provided with the transportation/storage medium and is capable of recording/reading information the address information necessary for the secondary sorting of the mails that are transferred to the transportation/storage medium in association with the ID; and in the secondary sorting post office at least: an information read-out step for reading out the address information for each ID that is recorded on the transportation/storage medium from the primary sorting post office; and delivery sorting control step for reading out the ID printed on the mails in the transportation/storage medium, acquiring the address information on the mails from the address information for each ID that is read out in the information read-out step and sorting the mails in delivery sorting boxes based on the acquired address information.

(9) A mail sorting method in a mail sorting system comprising a primary sorting post office for primary sorting mails as a processing of arrived mails and a secondary sorting post office for secondary sorting the primary sorted mails a processing for delivery mails, wherein comprising in the primary sorting post office at least: a feature extraction step for extracting a feature of each arrived mail and providing feature codes for identifying the mails; an address recognition step for sequentially recognizing from an address image of each mail address information that is necessary for the primary sorting and the secondary sorting; a sorting control step for sorting the mails in sorting boxes corresponding to the secondary sorting post office based on the recognized address information necessary for the primary sorting and upon filling-up either one of the sorting boxes for transferring the mails in the filled sorting box to a transportation/storage medium for transporting/storing the mails; and an information recording step for recording the address information of the mails necessary for secondary sorting of the mails transferred to transportation/storage medium on a recording mechanism that is provided with the transportation/storage medium and is capable of recording and reading information, and in the secondary sorting post office at least: an information read-out step for reading out the address information for each of the feature codes that are recorded on the recording mechanism from the primary sorting post office; and a delivery sorting control step for grasping the feature codes for identifying the mails by extracting the features of the mails in the transportation/storage medium, acquiring the address information on the mails from the address information for each feature code that are read in the information read-out step and sorting the mails in delivery sorting boxes.

(10) A mail sorting method, wherein the recording mechanism of the transportation/storage is a mounted non-contact IC chip that is capable of recording at least the address information for the secondary sorting in association with the ID or the feature code, or an affixed two dimension barcode that is capable of recording at least the secondary sorting address information in association with the ID or the feature code.

According to the mail sorting system and the mail sorting method according to the present invention, IDs and address information for specifying mails are recorded on transportation/storage medium such as trays, mail sacks or the like for transporting and/or storing mails to the secondary sorting post office and means to read out the IDs and address information recorded on the transportation/storage medium such as trays, mail sacks or the like is provided in the secondary sorting post office, thereby achieving the following technical advantages:

Firstly, since IDs and address information for specifying mails are recorded directly on the medium such as trays, mail sacks or the like for storing/transporting the mails in a readable manner, there is no need to build a large scale communication infrastructure between the primary sorting post office and the secondary sorting post office. And the relationship between the IDs and the address information for specifying mails can be transferred between the post offices using the transportation/storage medium of the mails, thereby enabling efficient secondary sorting (mail delivery processing) at the secondary sorting post office.

Since the IDs and the corresponding address information are recorded on the transportation/storage medium such as trays, mail sacks or the like at the time when sorting boxes for primary sorting mails become full and transferring mails into transportation/storage medium, there is no need to provide a delay route for address processing but enable to secure time for performing recognition processing of the address information to the sufficient level for the secondary sorting, for example, the video coding processing by VCS, thereby significantly reducing wasteful works to feed mails again in the primary sorting post office unlike prior art.

Moreover, since information such as IDs and address information are controlled by dividing into transportation/storage medium that accommodates several dozens or up to one hundred mails while avoiding concentration, there is no possibility of causing large scale consequential damages even if a trouble may occur in the database for recording information such as address information.

Continuing the description, the present invention features in that IDs (information for specifying mails) and address information printed on mails by the primary sorting post office are recorded on transportation/storage medium such as trays, mail sacks or the like for transporting/storing such mails and are transported to the secondary sorting post office. As a result, the primary sorting post office is able to determine transportation classifications to the secondary sorting post office at a stage of recognizing a level that enables to determine a particular secondary sorting post office as the address information (normally a ZIP code level).

This means that the primary sorting post office is able to perform the primary sorting at a stage in which the address information is not determined to the level sufficient for the secondary sorting, thereby enabling a high speed primary sorting and minimizing possibilities of feeding mails again.

Moreover, the time of recording the IDs and the address information or the like on the mail transportation/storage medium is when a sorting box to a secondary sorting post office is filled as a result of primary sorting and thus the mails in such sorting box are transferred to the mail transportation/storage medium. Accordingly, it is possible to secure sufficient time for the address recognition section to determine the address information for the secondary sorting (for example, to secure sufficient time for the operator to operate address keys in the VCS or the like) and to record the address information to a sufficient level for the secondary sorting (i.e., the information level including the address number and the condominium room number following the town name).

Accordingly, unlike the prior art, there is no need for printing the address barcode of the sufficient level for secondary sorting on each mail in the primary sorting post office, thereby enabling efficient secondary sorting at the secondary sorting post office. Furthermore, unlike the prior art, there is no need for providing a delay route in the address processing.

Additionally, since it is configured to transfer the IDs and the address information or the like to another post office, i.e., from the primary sorting post office to the secondary sorting post office, there is no need for building a large scale communication infrastructure or maintain and expand existing communication facilities between the post offices, thereby enabling to easily apply the present invention to post offices of relatively poor communication infrastructure environment.

In case of managing the mail IDs and the address information or the like in a database like in the prior art, once a damage in the database happens, a large amount of data for up to hundreds of thousands mails may be lost, thereby leading to a significant trouble. However, since the mail IDs and the address information or the like are managed in small units in a transportation/storage medium such as a tray, a mail sack or the like in the present invention, even if information on one transportation/storage medium may be lost, the damage is limited to about several dozens to hundred mails, thereby avoiding a large-scale trouble.

As for a method of recording the data such as the IDs and the address information or the like on the transportation/storage medium such as a tray, a mail sack or the like, it is easily achieved by mounting a non-contact IC chip capable of non-contact writing on each transportation/storage medium, or alternatively by affixing a label having printed two dimensional barcode that is capable of recording a large capacity of data on the transportation/storage medium.

BRIEF DESCRIPTION OF DRAWINGS

In the accompanying drawings.

EXEMPLARY EMBODIMENT

Now, exemplary embodiments of the mail sorting system and the mail sorting method according to the present invention will be described with reference to the accompanying drawings.

(Feature of the Present Invention)

Prior to a description of exemplary embodiments of the present invention, the features of the present invention will be described briefly. In the present invention, IDs for specifying mails (mail IDs) and address information or the like of such mails are recorded on transportation/storage medium such as trays in a primary sorting post office, mail sacks or the like for transporting/storing such mails before transportation to a secondary sorting post office. It is to be noted here that the transportation/storage medium such as trays, mail sacks or the like to be used for transportation or storage of such mails are provided with means such as non-contact type IC chips mounted thereon or two-dimensional barcode labels or the like affixed thereto.

As a result, it is possible to effectively perform the secondary sorting in the secondary sorting post office without printing an address barcode for secondary sorting directly on each mail. Moreover, there is no need for expanding and maintaining communication infrastructure between post offices, thereby enabling to easily adopt the system to mail service businesses having poor communication infrastructure.

Furthermore, in case of a method of controlling mail IDs and address information or the like by database, it is possible to encounter a major accident to lose a large quantity of data for up to or more than ten thousands mails in one time if the database is damaged. However, since information is controlled in a small quantity for each transportation/storage medium in the present invention, damages in case of losing information for one transportation/storage medium are limited to several dozens to one hundred mails that are contained in such one transportation/storage medium.

Construction of an Embodiment of the Present Invention

Figure 1:
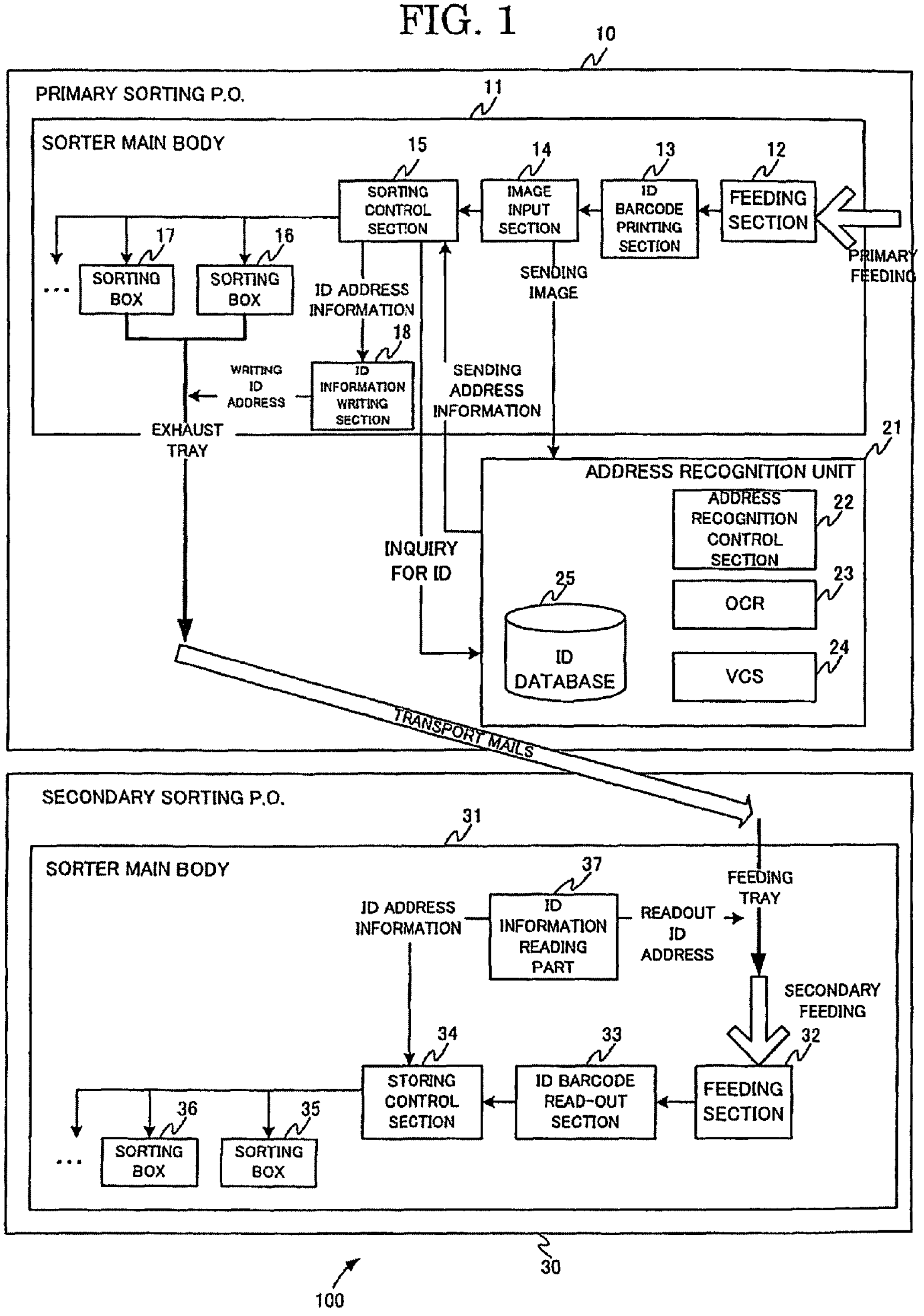
FIG. 1 is a system configuration of one example of the system comprising a primary sorting post office and a secondary sorting post office as one exemplary embodiment of the mail sorting system according to the present invention.

As one exemplary embodiment of the mail sorting system according to the present invention, an example of a system configuration comprising a primary sorting post office and a secondary sorting post office is shown in FIG. 1. Similar to the conventional mail sorting systems 100A, 100B, the mail sorting system 100 in FIG. 1 comprises a primary sorting post office 10 that engages with a primary sorting works corresponding to a primary stage sorting of arriving mails (processing of arriving mails) and a secondary sorting post office 30 that engages with a secondary sorting works corresponding to a secondary stage sorting of the mails that passed through the primary stage sorting (processing for delivery mails). It is to be noted that the primary sorting post office 10 and the secondary sorting post office are not only different post offices to each other but also the same post office.

Moreover, similarly to the conventional mail sorting system 10A, the primary sorting post office 10 comprises a sorter main body 11 that engages with primary sorting works and an address recognition unit 21 that performs address recognition processing necessary for both of the primary sorting works and the secondary sorting works. Similarly to the conventional mail sorting system 100A, the secondary sorting post office 30 comprises a sorter main body 31 that engages with secondary sorting works.

The sorter main body 11 that engages with the primary sorting works comprises at least a feeding section 12, an ID barcode printing section 13, an image input section 14, a sorting control section 15, sorting boxes 16, 17 and an ID information writing section 18. The address recognition unit 21 comprises at least an address recognition section 22, an OCR (Optical Character Reader) 23, VCS (Video Coding System) 24 and an ID database 25.

The feeding section 12 in the sorter main body 11 is designed to feed mails to the sorter main body 11 as primary feeding supplies for machine processing. The ID barcode printing section 13 is a printer for printing on the surface of each mail an ID barcode for specifying each mail. The image input section 14 is a scanner for imaging address information and barcode images and the images are inputted to the address recognition unit 21 for extracting the addresses and ID characters printed on such mails.

The sorting control section 15 is designed to control the overall operation of the sorter main body 11 and sorts the mails (primary sorting) in accordance with the address information recognized by the address recognition unit 21. The sorter boxes 16, 17 receive the primary sorted mails and one sorter box is provided for each primary classification. It is to be noted that the primary classifications are sufficient if they are the level such that the secondary sorting post office 30 is able to perform the secondary sorting, thereby not requiring to make the final sorting up to the secondary sorting. Normally, it is sufficient to perform sorting the mails into the sorting boxes at the stage when the address recognition unit 21 recognizes the ZIP code level.

The ID information writing section 18 is a circuit portion that is unique to the present invention. It is designed to write the ID for specifying contained mails and address information or the like corresponding to of such ID on the surface of each transportation/storage medium such as a tray, a mail sack or the like for transporting or storing such mails that are sorted into the sorting boxes 16, 17 as a result of primary sorting operation, thereby enabling to easily perform the secondary sorting works by referring in the secondary sorting post office 30 that engages with the secondary sorting.

It is to be noted that each of the transportation/storage media for transporting and storing mails such as trays, mail sacks or the like are designed to mount a non-contacting IC chip or affix a secondary barcode label or the like for writing the ID and the address information as described hereinabove. The feeding section 12, the ID barcode printing section 13 and the sorting boxes 16, 17 are completely identical to those in the sorter main body 11A in FIG. 3 for the conventional mail sorting system 100A.

The address recognition control section 22 in the address recognition unit 21 is designed to control the OCR 23 and the VCS 24 and also manage the ID database 25. The ID database 25 is a DB (database) for saving the ID and the address information that specifies each mail in association with each other. It is to be noted that the OCR 23 recognizes the ID of each mail based on the address image and the barcode image from the image input section 14 and also reads the character information of each mail up to the town name of the address of each mail including the ZIP code and the like.

On the other hand, the VCS 24 recognizes the address characters including the address number and the room number of a condominium in order to recognize the final level of the address information of each mail necessary for secondary sorting based on the address image and the barcode image from the image input section 14. In other words, the address recognition unit 21 sequentially performs not only the recognition processing of the address information necessary for primary sorting but also the recognition processing of the final level address information necessary for secondary sorting that is carried out in the secondary sorting post office 30. The recognized address information is recorded in the ID database 25 and also recorded on a transportation/storage medium such as trays, mail sacks or the like for accommodating mails by the ID information writing section 18.

That is, in the primary processing stage for machine processing mails for the first time in the primary sorting post office 10, the ID (mail ID) for specifying mail is printed on each mail by the ID barcode printing section 13 and the address information of each mail is recognized by the address recognition unit 21, thereby saving in the ID database 25 the ID for specifying each mail and the address information of each mail that is recognized by the address recognition unit 21 as a set.

The sorting control section 15 in the primary sorting post office 10 performs the primary sorting of mails in accordance with the address information based on the IDs and address information that are acquired by inquiring the address recognition unit 21. As described hereinabove, the address information that is used for the primary sorting is not required to be determined to the level necessary for the secondary sorting and is sufficient to be a level for enabling to determine the secondary sorting post office 30 (normally, the ZIP code level). The primary sorted mails are placed in respective sorting boxes 16, 17.

When one of the sorting boxes 16, 17 for a particular sorting address becomes full, mails accommodated in such sorting box are transferred into transportation/storage medium such as a tray, a mail sack or the like. At this time, the ID and the updated address information (at this stage, the updated address information recorded in the ID database 25 as the information recognized to the final level necessary for secondary sorting) for the mails are also written on the transportation/storage medium such as a tray, a mail sack or the like by the ID information writing section 18.

On the other hand, the sorter main body 31 that engages with the secondary sorting works comprises at least a feeding section 32, an ID barcode read-out section 33, a sorting control section 34, sorting boxes 35, 36 and an ID information read-out section 37.

The feeding section 32 in the sorter main body 31 feeds the primary sorted mails from the sorter main body 11 to the sorter main body 31 as secondary sorting supplies. The ID barcode read-out section 33 is a barcode reader for reading out the ID barcode for specifying each mail that is printed on the surface of each mail by the ID barcode printing section 13. The sorting control section 34 provides delivery sorting control means for controlling the overall operation of the sorter main body 31 and sorts the mails (secondary sorting) in accordance with the address information recognized by the address recognition unit 21. The sorting boxes 35, 36 are designed to accommodate the secondary sorted mails and a plurality of boxes are prepared as sorting boxes for secondary sorted destinations. It is to be noted that the secondary sorting is designed to perform the final level sorting for delivery of each mail.

Figure 3:
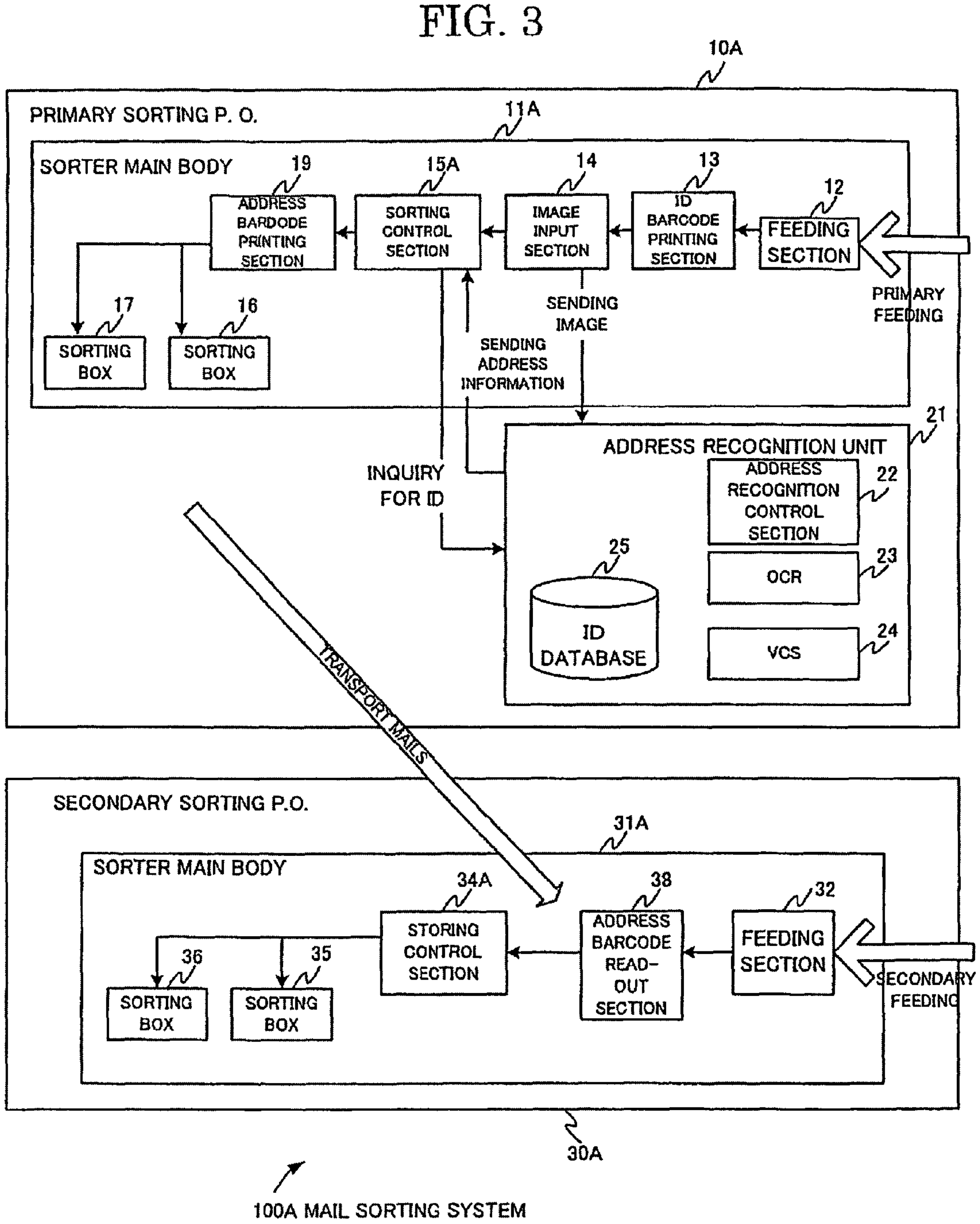
FIG. 3 is a system configuration of a first prior art system comprising a primary sorting post office and a secondary sorting post office.
Figure 4:
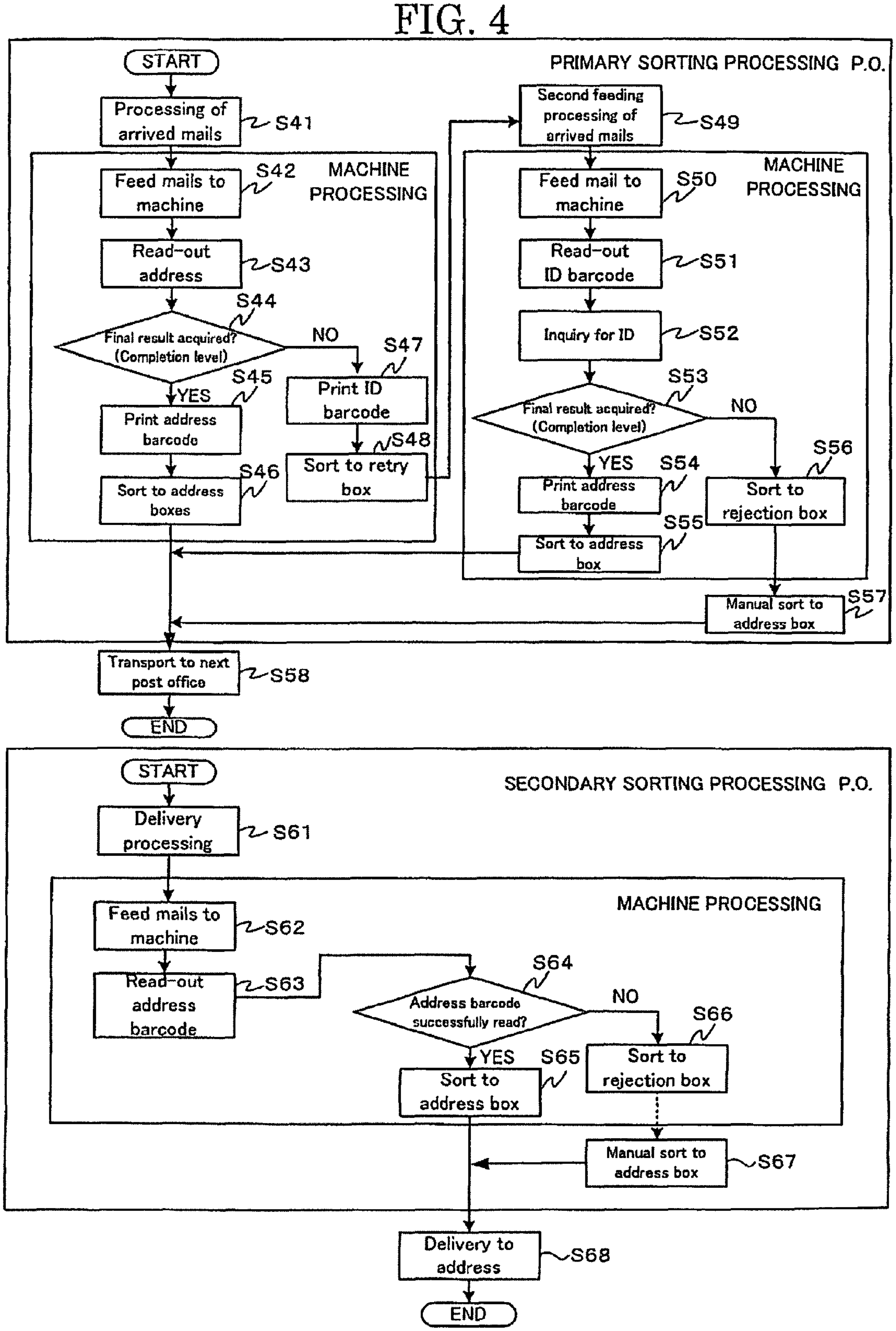
FIG. 4 is a flowchart to describe the operation of the prior art system as shown in FIG. 3.

The ID information read-out section 37 is a circuit portion unique to the present invention and reads out the IDs, the address information and the like of the mails in the transportation/storage medium that are written on the surface of such transportation/storage medium such as trays, mail sacks or the like for accommodating mails therein by the ID information writing section 18 in the primary sorting post office 10. It is to be noted herein that the constituent elements such as the feeding section 32, the ID barcode read-out section 33 and the sorting boxes 35, 36 are completely identical to those in the sorter main body 31A of the conventional mail sorting system 100A as shown in FIG. 3.

In other words, in the secondary sorting post office 30, the IDs, the address information and the like that are written on the transportation/storage medium such as trays, mail sacks or the like by the ID information writing section 18 in the primary sorting post office 10 are readout by the ID information read-out section 37. And such IDs, address information and the like are sent to the sorting control section 34 for being saved as a data table.

Moreover, the IDs printed on the mails fed by the feeding section 32 in the secondary sorting post office 30 are read out by the ID barcode read-out section 33 and sent to the sorting control section 34. Then, the sorting control section 34 takes the corresponding address information or the like from the previously registered data table for each ID of the mails. The sorting control section 34 performs the secondary sorting for every address of the mails for accommodation in the corresponding one of the sorting boxes 35, 36 and the like.

As shown in the embodiment of the mail sorting system 100 that has been described hereinabove with reference to FIG. 1, in the present invention, the ID information writing section 18 is newly provided in the sorter main body 11 in the primary sorting post office 10 for writing the IDs, the address information and the like on the transportation/storage medium such as trays, mail sacks or the like. The ID information read-out section 37 is also newly provided in the sorter main body 31 in the secondary sorting post office 30 for reading out the IDs, the address information and the like written on the transportation/storage media such as trays, mail sacks or the like. Accordingly, control operations of the sorting control section 15 in the sorter main body 11 in the primary sorting post office 10 and the sorting control section 34 in the sorter main body in the secondary sorting post office 30 differ from the operations in the conventional mail sorting system 100A in that the ID information writing section 18 and the ID information read-out section 37 are also controlled.

It is to be noted that the ID information writing section 18 and the ID information read-out section 37 that are circuit portions unique to the present invention may comprise, for example, an IC chip writer and an IC chip reader, respectively. The IC chip writer is a non-contacting IC chip mounted on each transportation/storage medium such as trays, mail sacks or the like for saving the IDs, the address information and the like. Alternatively, in case of affixing, for example, a barcode such as a two dimensional barcode or the like that is capable of storing a large capacity data on each transportation/storage medium such as trays, mail sacks or the like for recording the IDs, the address information and like in such barcode, the information writing section 18 is actually a label printer capable of printing such barcode and the ID information read-out section 37 is actually a barcode reader.

Operation of the Embodiment

Figure 2:
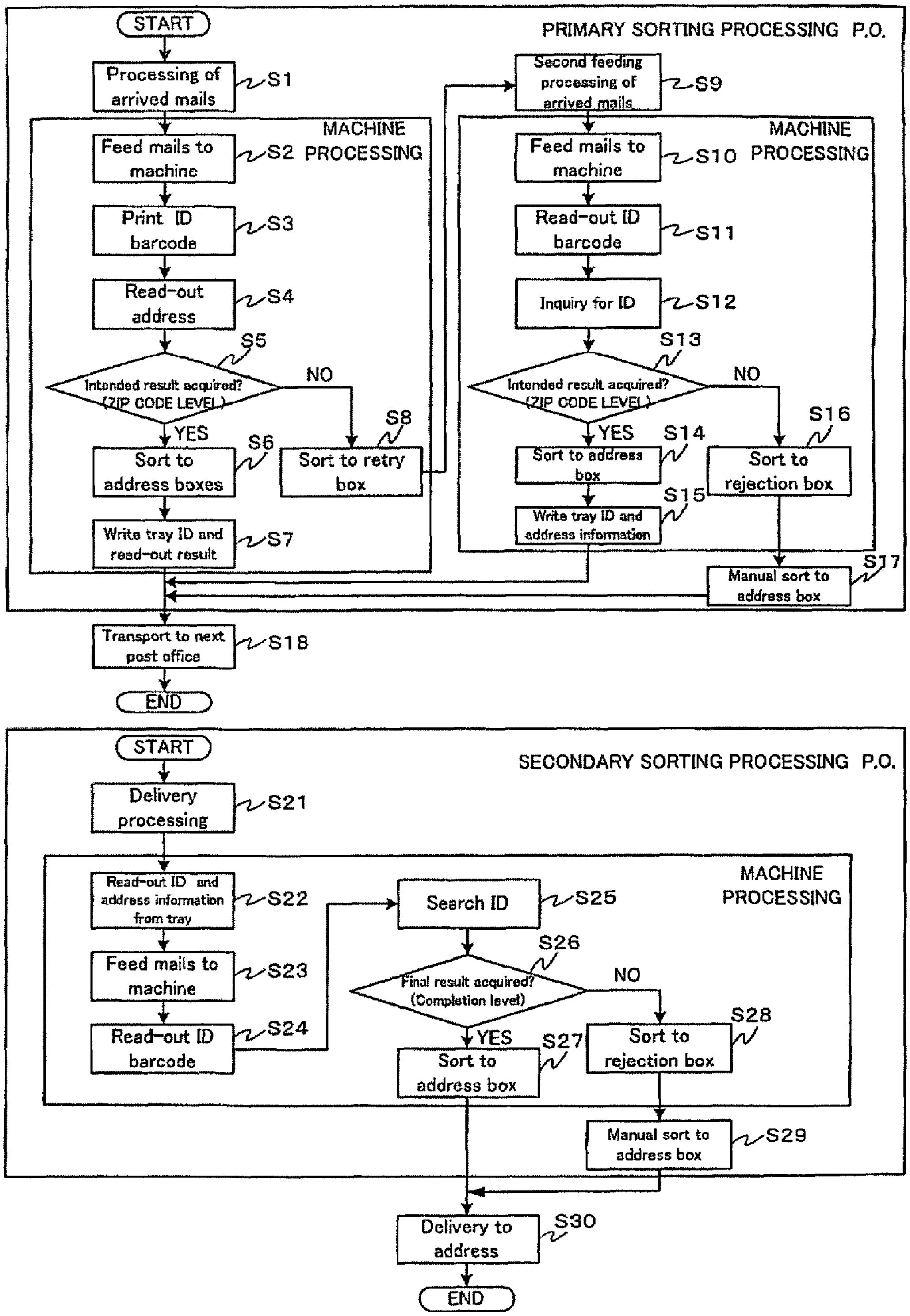
FIG. 2 is a flowchart for describing one exemplified operation of the mail sorting system of one exemplary embodiment according to the present invention as shown in FIG. 1.

Now, an exemplified operation of the mail sorting system 100 as shown in FIG. 1 will be described with reference to the flowchart as shown in FIG. 2. FIG. 2 is a flowchart for describing an exemplified operation of the mail sorting system 100 in FIG. 1 that is an embodiment of the present invention. In FIG. 2, steps S1-S18 are operations (processing for arrived mails) in the primary sorting post office 10, while step S21-S30 are operations (processing for delivery mails) in the secondary sorting post office 30.

In the flowchart in FIG. 2, mails collected from mailboxes or the like are first placed in front of the sorter main body 11 in the primary sorting post office 10 (step S1). Subsequently, the collected mails are fed to the feeding section 12 in the sorter main body 11 for performing machine processing for primary sorting (processing for arrived mails) (step S2). The barcode printing section 13 prints an ID for specifying each mail on the surface of the mails fed by the feeding section 12 (step S3).

Then, images of the address and the ID of each mail are read by an optical scanner or the like in the image input section 14 and sent to the address recognition unit 21 (step S4). The OCR 23 and the VCS 24 in the address recognition unit 21 sequentially recognize the addresses and the IDs for determining the updated address information corresponding to each ID.

The determined IDs, the address information and the like are sequentially saved in the ID database 25. That is, as recognition processing of the address information by the OCR 23 and the VCS 24 progresses, the address information are sequentially saved in the Id database 25 as the updated address information. Moreover, in response to any inquiry from the sorting control section 15, the determined IDs and the address information are sent to the sorting control section 15.

In the sorting control section 15, upon receiving the IDs and address information recognized by the address recognition unit 21, a judgment is made if the recognition to the level specifying the secondary sorting post office 30 (normally, the Zip code level) that engages with the secondary sorting has been made (step S5). If recognized to the level capable of specifying the secondary sorting post office 30 for performing the secondary sorting (YES in step S5), the mail is put in one of the sorting boxes 16, 17 corresponding to the address (step S6).

If any of the sorting boxes is filled with mails, the mails contained in the filled sorting box are transferred to a transportation/storage medium (a tray, a mail sack or the like) for transporting or storing mails. When the mails into such transportation/storage medium have been transferred, the updated address information or the like on the IDs of the transferred mails are read out of the ID database 25 in the address recognition unit 21. The IDs, the address information and the like are recorded on the transportation/storage medium (tray, mail sack or the like) as the data by the ID information writing section 18 (step S7). In case of using an IC chip as a data recording format on the transportation/storage medium, a dedicated device is used for writing such data in the IC chip. Alternatively, in case of using a two dimensional barcode is used as a data recording format to the transportation/storage medium, a label in form of a two dimensional barcode is issued And the issued two dimensional barcode is affixed to the transportation/storage medium.

It is to be noted that since sufficient time has passed from starting the recognition processing of the IDs, the address information and the like by the address recognition unit 21 in step S4 when the IDs, the address information and the like are recorded on the transportation/storage medium in step S7, the address information to the sufficient level for secondary sorting by the VCS 24 in the address recognition unit 21 has normally been completed. It is therefore possible to record the information of the level enabling the secondary sorting (i.e., the level containing not only the town name but also the address number and the condominium room number) on the transportation/storage medium in association with the IDs as the updated address information to be recorded on the transportation/storage medium in step S7.

On the other hand, if the recognition result is a level insufficient for specifying the second sorting post office 30 that engages with the secondary sorting (NO in step S5), it is impossible to use the classification of the primary sorting as addressing of the mail, it is classified into a sorting box for retrial (step S8). Consequently, it is brought in front of the sorter main body 11 for performing retrial processing of the mail (step S9) and the mail is fed again to the feeding section 12 in the sorter main body 11 (step S10).

Then, the ID barcode printed on the surface of the mail that is supplied again to the feeding section 12 is read by an optical scanner (the ID barcode read-out section) not shown in FIG. 1 and sent to the sorting control section 15 (step S11). The sorting control section 15 inquires the ID database 25 in the address recognition unit 21 for the updated address information corresponding to the read-out ID (step S12). The ID database 25 reads out the updated address information corresponding to the ID and returns it to the sorting control section 15.

The sorting control section 15 that receives the address information from the ID database 25 checks if the received updated address information that is the result of the primary sorting is in the level (ZIP code level) enabling to specify the secondary sorting post office 30 that engages with the secondary sorting (step S13). As mentioned hereinabove, it is normally enough if the ZIP code level is read. Since a sufficient time has passed at this point since the start of the address information recognition operation in the address recognition unit 21 in step S4, the address information to the level sufficient for primary sorting can be obtained normally as long as a correct address is written on a mail.

As to the mail that is supplied again, if it is successful in recognizing to the level enabling to specify the secondary sorting post office 30 that engages with the secondary sorting (YES in step S13), the mail is sorted and put in one of the sorting boxes 16, 17 and the like corresponding to the address of the specified secondary sorting post office 30 similar to the case in step S6 (step S14).

Subsequently, if any of the sorting boxes is filled with mails, the mails in such sorting box are transferred to a medium for transporting or storing mails (such as trays, mail sacks or the like) either manually or automatically as is the case in step S7. At the time of transferring the mails to the transportation/storage medium, the updated address information or the like on the IDs of the transferred mails are read from the ID database 25 in the address recognition unit 21 and the IDs, the address information and the like are recorded on the transportation/storage medium (such as a tray, a mail sack or the like) as data by the ID information writing section 18 (step S15).

As described hereinabove, in case of using an IC chip as the data recording format on the transportation/storage medium, the data is written by a dedicated device in the IC chip. Alternatively, in case of using a two dimensional barcode as the data recording format on the transportation/storage medium, a two dimension barcode label is issued by a printer and the issued two dimension barcode is affixed onto the transportation/storage medium.

On the other hand, if the recognition result of the retrial mail is in a level that is unable to specify the secondary sorting post office 30 that engages with the secondary sorting (NO in step S13), it is impossible to machine process the primary sorting for addressing such mail. Therefore, the mail is put in an rejection box for manual processing (step S16). Then, a manual sorting is carried out on such mail for putting it in the corresponding one of the sorting box 16, 17 and the like (step S17).

Upon completing the primary sorting in the primary sorting post office 10 in the above manner, a transportation processing for the secondary sorting will be initiated (step S18). If the secondary sorting post office 30 that engages with the secondary sorting is a different post office from the primary sorting post office 10, the transportation will be carried out in the condition that the mails are kept in the transportation/storage medium (such as a tray, a mail sack or the like). On the other hand, if the secondary sorting post office that engages with the secondary sorting is the same post office as the primary sorting post office 10, the mails are stocked in the transportation/storage medium (a tray, a mail sack or the like).

Now, description will be made on the operation of the secondary sorting post office 30 that engages with the secondary sorting (delivery processing) of mails passed through the primary sorting. Firstly, the mails passed through the primary sorting are placed in front of the sorter main body 31 in the secondary sorting post office 30 in the condition contained in the transportation/storage medium (such as a tray, a mail sack or the like) (step S21). Subsequently, the ID, the address information and the like that are recorded on the transportation/storage medium are read out by the ID information read-out section 37 and sent to the sorting control section 34 (step S22).

In case of using an IC chip as the data recording format on the transportation/storage medium, the data in the IC chip is read out by a dedicated IC chip reader. Alternatively, in case of using a two dimension barcode as the data recording format on the transportation/storage medium, the two dimension barcode label is read out by a two dimension barcode reader as described hereinabove.

Then, the mails contained in the transportation/storage medium (such as a tray, a mail sack or the like) are taken out of the transportation/storage medium for performing machine processing for secondary sorting (processing of delivery mails) and supplied to the feeding section 32 in the sorter main body 31 (step S23). The ID barcodes of the mails are read out by an optical scanner or the like of the ID barcode read-out section 33 and sent to the sorting control section 34 (step S24).

Subsequently, the sorting control section 34 acquires the ID information corresponding to the ID from the ID barcode read-out section 33 by conducting a search based on the relationship with the ID and the address information that are sent from the ID information read-out section 37 in step 22 (step S25). Then, it is checked if the acquired information is the level sufficient for the secondary sorting (finally completed level) as the acquired address information (step S26). If acquired the information of the level sufficient for the secondary sorting (finally completed level) (YES in step S26), the mails are put in one of the sorting boxes 35, 36 and the like corresponding to the acquired address information (step S27).

On the other hand, if it failed to acquire the information of sufficient level (finally completed level) for secondary sorting (NO in step S26), it is determined as the address information unable to perform machine processing for the secondary sorting and the mail is put in a rejection box for performing a manual sorting processing (step S28). Then, a manual sorting processing of the mail is carried out and the mail is put in the corresponding one of the sorting boxes 35, 36 (step S29).

Upon completing the secondary sorting in the secondary sorting post office 30 as described hereinabove, mails contained in each sorting box 35, 36 are taken out for performing delivery processing for each address (step S30).

Description of Advantages of the Embodiment

As described in detail hereinabove, the embodiment of the present invention features in readably record IDs for specifying mails and the corresponding address information directly on transportation/storage medium such as trays, mail sacks or the like as transportation/storage medium for mails, thereby eliminating the need for preparing communication infrastructure between post offices acting as the primary sorting post office 10 and the secondary sorting post office 30. Correspondence between the IDs and the address information can be transferred between the post offices by using the transportation/storage medium for the mails. Accordingly, it is possible to effectively perform the secondary sorting (delivery processing) in the secondary sorting post office 30.

Moreover, at the time when any one of the sorting boxes for primary sorting of mails becomes full and the mails are transferred to transportation/storage medium such as trays, mail sacks or the like, the IDs and the corresponding address information are recorded on such transportation/storage medium. This enables to have a sufficient time for carrying out the video coding processing for recognizing the address information (for example, the time for the operator to keying the addresses of the VCS or the like) by the VCS 24 to a level sufficient for secondary sorting without specially providing a delay route for the address processing unlike the prior art. Accordingly, it is possible to significantly reduce wasteful works of feeding again the mails in the primary sorting post office 10 unlike the prior art.

Additionally, since such information as the IDs, the address information and the like are not concentrated but controlled by dividing into about several dozens to one hundred mails that are limited by the capacity of each transportation/storage medium, it is possible to avoid a large scale consequential trouble even in case of trouble in the database for recording the address information and the like.

Another Embodiment of the Invention

In the above embodiment, the ID barcode for identifying each mail is printed on the surface of each mail by the ID barcode printing section 13 in the primary sorting post office 10. However, the present invention is not restricted to only such case of printing the ID barcode for identifying each mail on the surface thereof. For example, any feature for identifying each mail such as, for example, color information and pattern information of each mail may be coded as the information for distinguishing each mail may be used as a replacement for the IDs. Normally, the feature acquired from color information of each mail is vague and may be difficult to accurately distinguish one mail out of a large number of mails such as over several thousands.

However, in case of applying the present invention wherein, for example, trays are used as transportation/storage medium for transporting or storing mails, the capacity of containing mails in each tray is small and normally about one hundred mails full up the tray. Accordingly, vague feature such as color information of mails is effective for finding the address information of each mail at relatively high provability if the number of mails is restricted to about one hundred, thereby enabling to eliminate printing ID on each mail by the ID barcode printing section 13 and reading such ID from each mail by the ID barcode read-out section 33. It is therefore possible to achieve the mail sorting system that helps to reduce the time necessary for sorting the mails.

The timing of writing data of the IDs, the address information and the like on the transportation/storage media such as trays, mail sacks or the like or of reading the data should not be restricted to the timing in the above embodiment and can be modified freely depending on particular construction of the mail sorting system. For example, if the primary sorting post office is provided with a conveyor system for transporting the transportation/storage medium such as trays, mail sacks or the like, the timing of writing data on the transportation/storage media such as trays, mail sacks or the like may be at the time immediately before loading the transportation/storage medium such as trays, mail sacks or the like on a transportation track.

In case of writing at the timing just before loading the transportation/storage medium on a transportation track, it is possible to have further processing time, i.e., the video coding time for recognizing the address information to the level necessary for secondary sorting by the VCS 24 in the address recognition unit 21, thereby enabling to determine the address information of more mails to the level necessary for secondary sorting. Similarly, the timing for reading the data from the transportation/storage medium such as trays, mail sacks or the like may be the time when unloading the transportation/storage medium such as trays, mail sacks or the like from the transportation track.

Figure 5:
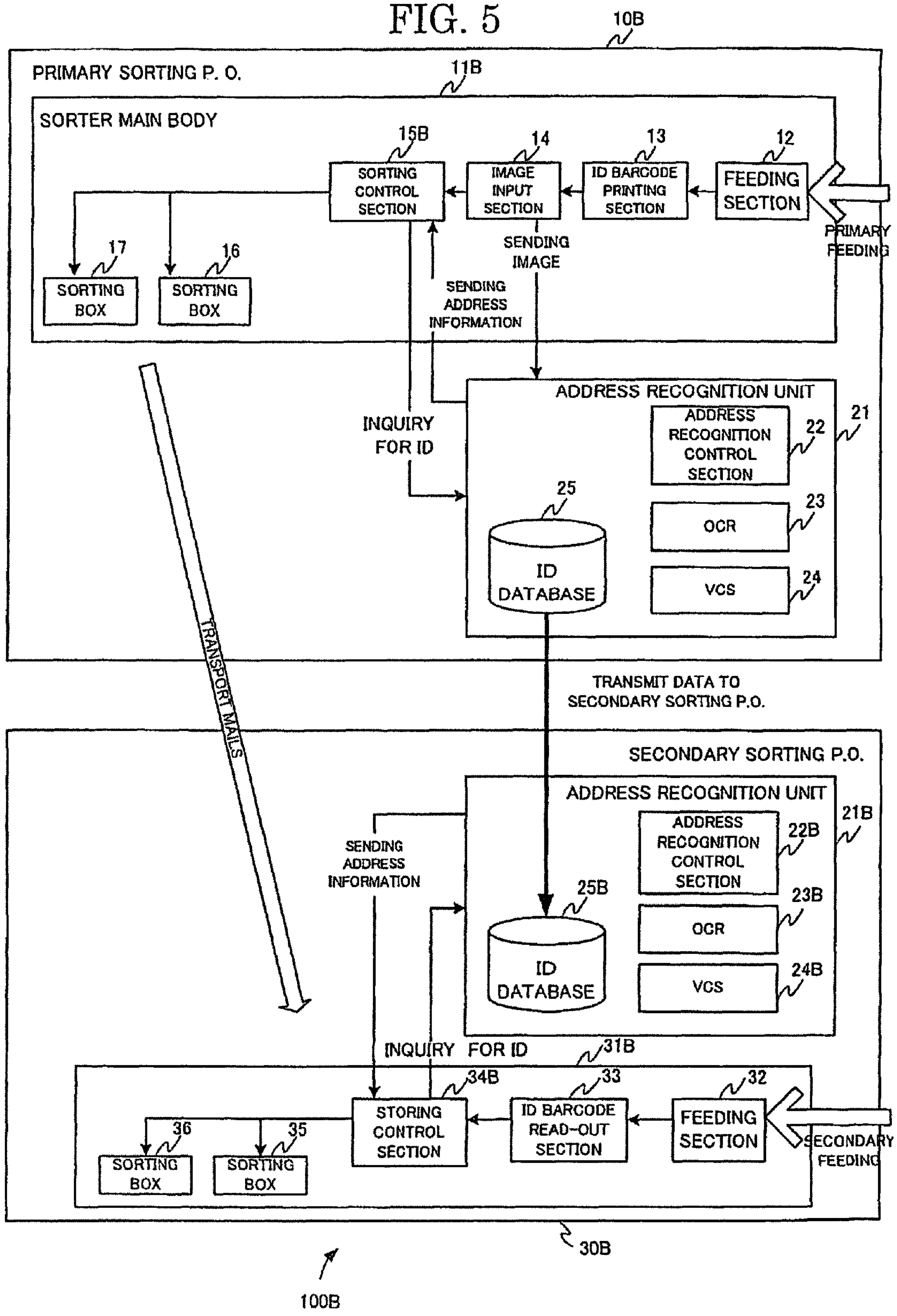
FIG. 5 is a system configuration of a second prior art mail sorting system comprising a primary sorting post office and a second sorting post office.
Figure 6:
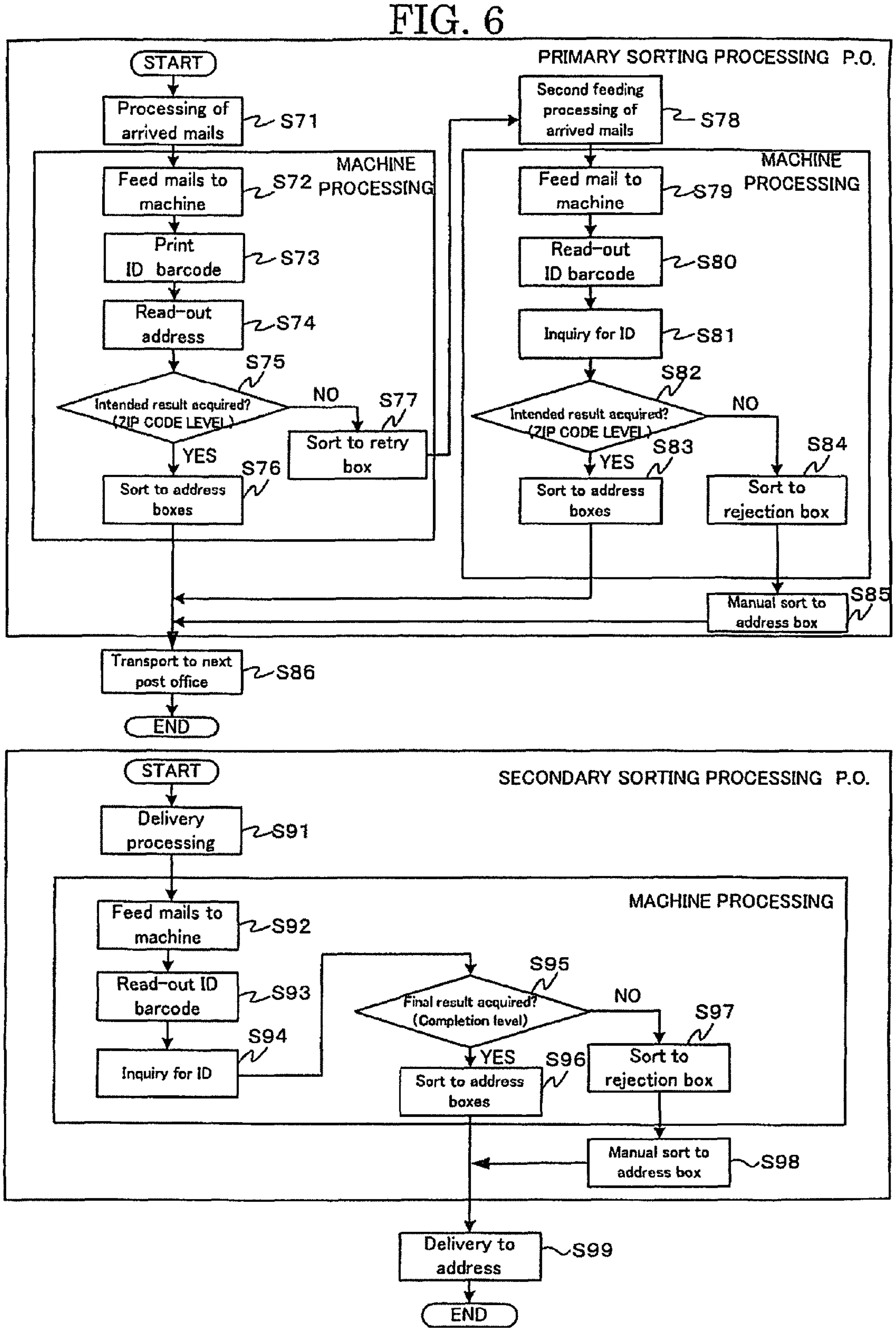
FIG. 6 is a flowchart to describe the operation of the prior art mail sorting system as shown in FIG. 5.

Furthermore, it is also possible to combine the mail sorting system according to the present invention with the conventional mail sorting system 100A as shown in FIG. 3 or the conventional mail sorting system 100B as shown in FIG. 5. For example, it is possible to use the mail sorting system according to the present invention as a buck-up in case of trouble of the mail sorting system 100B as shown in FIG. 5. This means that mail sorting is normally carried out using the ID database and the communication infrastructure like the conventional mail sorting system 100B as shown in FIG. 5 but the data (the IDs and the address information) that are recorded on the transportation/storage medium such as trays, mail sacks or the like are used like the mail sorting system 100 according to the present invention as shown in FIG. 1 in case of any damage of the ID database 25B in the secondary sorting post office 30B, thereby enabling to continuously carry out the secondary sorting processing (processing for delivery mails).

It is to be noted that the data to be written on the transportation/storage media such as trays, mail sacks or the like may include other information in addition to the two kinds of information, i.e., the IDs and the address information. For example, traceability information such as physical information of the mails (such as shapes, color and the like), the sender information of the mails, dates of processing and the like may be included.

While the invention has been particularly shown and described with reference to exemplary embodiments thereof, the invention is not limited to those embodiments. It will be understood by those of ordinary skill in the art that various changes in form and details may be made without departing from the spirit and scope of the present invention as defined in claims.

What is claimed is:

1. A mail sorting system comprising a primary sorting post office for performing primary sorting of mails as arrived mail processing and a secondary sorting post office for performing a secondary sorting of the primary sorted mails, wherein:

the primary sorting post office comprises at least ID printing means for printing an ID on each arrived mail, address recognition means for sequentially recognizing address information necessary for primary sorting and secondary sorting from an address image of each mail and for saving the address information in association with the IDs in a database, sorting control means for sorting the mails in sorting boxes corresponding to the secondary sorting post office based on the address information necessary for primary sorting recognized by the address recognition means and for transferring mails in any of the sorting boxes into a transportation/storage medium at the time of filling the sorting box, and information writing means for acquiring from the database the address information necessary for secondary sorting of the mails that are transferred into the transportation/storage medium and for writing the address information in association with the IDs in a recording mechanism provided with the transportation/storage medium in such manner to record and read information; and the secondary sorting post office comprises at least information read-out means for reading out the address information for each ID recorded in the recording mechanism on the transportation/storage medium from the primary sorting post office, and delivery sorting control means for reading out the ID printed on each mail contained in the transportation/storage medium, acquiring the address information for the mail by the address information for each ID that is read out by the information read-out means, and sorting the mails in sorting boxes for delivering the mails based on the acquired address information.

2. A mail sorting system comprising a primary sorting post office for primary sorting mails as a processing for arrived mails and a secondary sorting post office for secondary sorting the primary sorted mails as a processing for delivery mails, wherein:

the primary sorting post office comprises at least feature extraction means for extracting features of each arrived mail in order to provide a feature code for identifying the mail, address recognition means for sequentially recognizing from address images of the mails address information thereof that are necessary for the primary sorting and the secondary sorting and for saving the address information in a database in association with the feature codes, sorting control means for sorting the mails in sorting boxes corresponding to the secondary sorting post office based on the address information necessary for the primary sorting that is recognized by the address recognition means and for transferring the mails in each of the sorting boxes into a transportation/storage medium for transporting/storing the mails when each of the sorting boxes is filled, and information writing means for acquiring address information necessary for secondary sorting of the mails from the database and for writing the acquired address information in association with the feature codes on a recording mechanism that is provide with the transportation/storage medium in a manner to write and read information, and the secondary sorting post office comprises at least information read-out means for reading out the address information for each feature code that is recorded on the transportation/storage means from the primary sorting post office, and delivery sorting control means for grasping the feature codes for identifying the mails by extracting features of mails in the transportation/storage medium, acquiring the address information on the mails from the address information for each feature code that is read out by the information read-out means and for sorting the mails into sorting boxes for delivery of the mails based on the acquired address information.

3. A mail sorting system of claim 2, wherein the feature of each mail that the feature extraction means extracts uses at least shape and/or color information of the mail.

4. A mail sorting system of claim 1, wherein the time when the information writing means records the address information on the transportation/storage medium in association with the ID is the time when the sorting control means detects the full-up of the sorting box corresponding to the secondary sorting post office and transfers the mails in the sorting box into the transportation/storage medium.

5. A mail sorting system of claim 1, wherein the time when the information read-out means reads out the address information for each ID that is recorded on the transportation/storage medium from the primary sorting post office by the recording mechanism is on or before the time when the transportation/storage medium reaches the counter for performing the machine processing for the secondary sorting.

6. A mail sorting system of claim 1, wherein the recording mechanism on the transportation/storage medium comprises means for mounting a non-contact IC chip that can record at least address information for secondary sorting in association with the ID, or means for affixing a two dimensional barcode that can record at least the address information for secondary sorting in association with the ID.

7. A mail sorting system of claim 1, wherein the recording mechanism on the transportation/storage medium additionally records information including at least shape and/or color of the mail and/or the sender of the mails.

* * * * *